(12) United States Patent
Fort et al.

(10) Patent No.: US 11,768,512 B2
(45) Date of Patent: Sep. 26, 2023

(54) METHOD OF SMOOTHING A CURRENT CONSUMED BY AN INTEGRATED CIRCUIT, AND CORRESPONDING DEVICE

(71) Applicant: STMicroelectronics (Rousset) SAS, Rousset (FR)

(72) Inventors: Jimmy Fort, Puyloubier (FR); Nicolas Demange, Saint-Maximin (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 191 days.

(21) Appl. No.: 17/119,788

(22) Filed: Dec. 11, 2020

(65) Prior Publication Data

US 2021/0181778 A1 Jun. 17, 2021

(30) Foreign Application Priority Data

Dec. 12, 2019 (FR) .................................. 1914244

(51) Int. Cl.
*G05F 3/26* (2006.01)
*G05F 1/46* (2006.01)

(52) U.S. Cl.
CPC .............. *G05F 3/262* (2013.01); *G05F 1/461* (2013.01)

(58) Field of Classification Search
CPC ..... G05F 3/00; G05F 3/02; G05F 3/08; G05F 3/16; G05F 3/185; G05F 3/20; G05F 3/205; G05F 3/22; G05F 3/222; G05F 3/227; G05F 3/24; G05F 3/242; G05F 3/247; G05F 3/26; G05F 3/262; G05F 3/265; G05F 3/267; G05F 3/30; G05F 1/10; G05F 1/46; G05F 1/461; G05F 1/462; G05F 1/467; G05F 1/468; G05F 1/56; G05F 1/561; G05F 1/563; G05F 1/569; G05F 1/571; G05F 1/575; G05F 1/614; H01L 23/57; H01L 23/576; G06F 21/00; G06F 21/70; G06F 21/71; G06F 21/75; G06F 21/755; H04L 9/00; H04L 9/002; H04L 9/003
(Continued)

(56) References Cited

U.S. PATENT DOCUMENTS 4,932,053 A 6/1990 Fruhauf et al.
6,107,868 A 8/2000 Diniz et al.
(Continued)

FOREIGN PATENT DOCUMENTS

CN 205788193 U 12/2016
CN 106560757 A 4/2017
(Continued)

OTHER PUBLICATIONS

Vahedi, H., et al., "On-Chip Current Flattening Circuit with Dynamic Voltage Scaling," 2006 IEEE International Symposium on Circuits and Systems, May 21-24, 2006, pp. 4277-4280.
(Continued)

*Primary Examiner* — Thienvu V Tran
*Assistant Examiner* — Carlos O Rivera-Perez
(74) *Attorney, Agent, or Firm* — Slater Matsil, LLP (57) ABSTRACT

An embodiment method for smoothing consumed current is based on a current copying suite and on a current source supplying a reference current, the currents being transformed into a reference voltage for the regulation of a voltage regulator such that the consumed current viewed by the power supply only depends on the reference current.

22 Claims, 7 Drawing Sheets

(58) Field of Classification Search
USPC ........ 323/223–226, 266, 269–271, 273–276, 323/280–285, 304, 311–317, 351; 361/18, 88–92; 380/252–254, 287, 22–53
See application file for complete search history.

(56) References Cited

U.S. PATENT DOCUMENTS

| | | | |
|---|---|---|---|
| 7,227,401 | B2 | 6/2007 | Zhang et al. |
| 7,372,965 | B1 | 5/2008 | Wuidart |
| 7,571,492 | B2 | 8/2009 | Hubert |
| 7,605,575 | B2 | 10/2009 | Leutgeb et al. |
| 7,808,842 | B1 * | 10/2010 | Raghavan ............... G11C 16/30 365/207 |
| 8,305,134 | B2 * | 11/2012 | Hirose .................... G05F 3/242 327/513 |
| 8,334,705 | B1 | 12/2012 | Gunnam et al. |
| 8,635,467 | B2 | 1/2014 | Gunnam et al. |
| 8,780,517 | B2 | 7/2014 | Fukami |
| 8,786,359 | B2 | 7/2014 | Bhuiyan |
| 9,678,525 | B2 | 6/2017 | Demange et al. |
| 9,787,171 | B2 | 10/2017 | Fort |
| 9,891,639 | B2 | 2/2018 | Fort et al. |
| 10,054,973 | B2 | 8/2018 | Demange et al. |
| 10,122,270 | B2 | 11/2018 | Nagda et al. |
| 11,037,522 | B2 | 6/2021 | Naccari et al. |
| 11,507,704 | B2 | 11/2022 | Nedovic et al. |
| 2005/0027471 | A1 | 2/2005 | Vergnes |
| 2005/0218872 | A1 | 10/2005 | Wich |
| 2006/0125463 | A1 | 6/2006 | Yen et al. |
| 2006/0156039 | A1 | 7/2006 | Deveaud et al. |
| 2015/0001938 | A1 | 1/2015 | Fort |
| 2017/0192448 | A1 | 7/2017 | Demange et al. |
| 2022/0066488 | A1 | 3/2022 | Demange et al. |
| 2022/0066494 | A1 | 3/2022 | Demange et al. |

FOREIGN PATENT DOCUMENTS

| | | |
|---|---|---|
| CN | 109656305 A | 4/2019 |
| EP | 0357366 A1 | 3/1990 |
| EP | 0368727 A1 | 5/1990 |
| EP | 0523266 A1 | 1/1993 |
| FR | 2793904 A1 | 11/2000 |
| FR | 2857804 A1 | 1/2005 |
| FR | 3007857 A1 | 1/2015 |
| FR | 3042066 | 4/2017 |
| WO | 9966452 A1 | 12/1999 |
| WO | 2004027688 A2 | 4/2004 |

OTHER PUBLICATIONS

Das, Debayan et al., "EM and Power SCA-Resilient AES-256 Through >350X Current-Domain Signature Attenuation and Local Lower Metal Routing", IEEE Journal of Solid-State Circuits, vol. 56, No. 1, Jan. 2021, 15 pages.

Karagounis, Michael et al., "An Integrated Shunt-LDO Regulator for Serial Powered Systems", IEEE Proceedings of ESSCIRC, Greece, Sep. 14-18, 2009, 4 pages.

Li, Xuequn et al., "An Integrated Current Flattening Module for Embedded Cryptosystems", IEEE International Symposium on Circuits and Systems, May 23-26, 2005, Japan, 4 pages.

Mesquita, Daniel et al., "Current Mask Generation: A Transistor Level Security Against DPA Attacks," SBCCI'05, Brazil, Sep. 4-7, 2005, pp. 115-120.

Serrano-Gotarredona, Teresa et al., "Voltage Clamping Current Mirrors with 13-decades Gain adjustment Range Suitable for Low Power MOS/Bipolar Current Mode Signal Processing Circuits", IEEE International Symposium on Circuits and Systems, Jul. 31, 1998, 4 pages.

Vahedi, Haleh et al., "On-Chip Current Flattening Circuit with Dynamic Voltage Scaling", IEEE International Symposium on Circuits and Systems, May 21-24, 2006, 4 pages.

U.S. Appl. No. 17/399,617, filed Aug. 11, 2021.
U.S. Appl. No. 17/399,674, filed Aug. 11, 2021.
U.S. Appl. No. 18/167,521, filed Feb. 10, 2023.
U.S. Appl. No. 15/150,713, filed May 10, 2016.
U.S. Appl. No. 15/467,927, filed Mar. 23, 2017.

* cited by examiner

METHOD OF SMOOTHING A CURRENT CONSUMED BY AN INTEGRATED CIRCUIT, AND CORRESPONDING DEVICE

CROSS-REFERENCE TO RELATED APPLICATIONS

This application claims the benefit of French Application No. 1914244, filed on Dec. 12, 2019, which application is hereby incorporated herein by reference.

TECHNICAL FIELD

Various embodiments and methods for implementing the invention relate to integrated circuits, and more particularly to integrated circuits comprising secure modules, and notably the protection of these modules against external attacks of the Simple Power Analysis (SPA) type.

BACKGROUND

An integrated circuit comprising a module can be the target of attacks aimed at recovering secure information, and in particular attacks by analysis of power consumption or SPA.

In operation, an integrated circuit consumes more or less power depending on the operations that it is carrying out. The SPA attack includes analyzing these variations in power consumption in particular to deduce indications regarding the operations carried out and/or their occurrences.

In secure applications, it is therefore recommended to smooth the power consumption seen from the power supply as much as possible so that it is difficult for a potential attacker to determine the activity of the various components of the circuit by SPA attacks.

Means exist for protecting against SPA attacks, comprising, for example, current copying and amplifying means implementing two MOS transistors, in particular MOS transistors configured as a mirror, a first transistor comprising a W1/L1 ratio of less than the W2/L2 ratio of a second transistor, for example a W1/L1 ratio that is one hundred times smaller than the W2/L2 ratio to amplify a current so as to create an additional current to complete the current consumed by the integrated circuit such that the overall current consumed by the integrated circuit is constant, independently of the operations carried out by the integrated circuit.

However, since the W2/L2 ratio is much higher than the W1/L1 ratio of the first transistor, the second transistor comprises a stray capacitance greater than that of the first transistor such that the dynamic response of the second transistor during the transient phase is degraded relative to that of the first transistor, slowing the operation of the protection means.

Slowing of the protection means can result in a time delay in the generation of the additional current such that the overall current consumed by the integrated circuit is no longer constant, providing power consumption information during SPA attacks.

Slowing of the protection means is especially significant when the currents consumed by the integrated circuit to carry out operations are high, for example in the order of 30 to 50 mA.

There is a need to improve the dynamic response of the protection means against SPA attacks during the transient phase.

SUMMARY

Embodiments and methods for implementing the invention advantageously reduce the size of the transistors of the current copying and amplifying means.

According to one aspect, a method smooths the current consumed by a power supply for an electronic circuit, the electronic including at least one module, for example a microprocessor, a memory, etc., powered directly or indirectly, for example via a voltage regulator, by the power supply and consuming a module current.

The method according to this aspect includes generating, for each module, a module auxiliary current equal to a first fraction of the corresponding module current, generating by a first stage, powered by the power supply, including at least one current source, a stage current higher than the sum of the maximum values of each module auxiliary current, generating an intermediate current equal to the difference between the stage current and a secondary current equal to the sum of each module auxiliary current, generating a reference potential by multiplying, in a first branch of a regulating stage powered by the power supply, the intermediate current by an impedance equal to one, and controlling the voltage of a regulating means of a second branch of the regulating stage such that a potential of the second branch is equal to the reference potential, the potential being obtained by multiplying a current circulating in the branch by a multiplication factor equal to the first fraction.

Thus, in the method according to this aspect, a plurality of currents consumed by the power supply are generated in a simple manner, the sum whereof does not depend on the current consumed by each module but only in theory on the current supplied by the current source stage.

The power consumption of the integrated circuit is thus smoothed, and this overall smoothed power consumption as externally viewed is higher than the sum of the maximum power consumptions of each module.

In order to smooth the power consumption, the regulating means is voltage-controlled such that the dynamic response of the electronic circuit in the transient phase is improved.

The value of the first fraction can be chosen from a set of values.

The first stage can further include at least one additional activatable current source supplying an additional current and the stage current is equal to the sum of the main current and of each additional current supplied by each activated additional current source.

Thus, by activating successively and/or simultaneously the various current sources, the current consumed by the power supply varies, which renders the detection of the variations of the module current even more difficult.

In this regard, it is also possible to add capacitive noise within the device, for example, at the output of the first stage.

According to another aspect, an electronic device comprises a power supply terminal, and at least one module connected to the power supply terminal and configured so as to consume a module current, first generation means connected to the power supply terminal and configured so as to generate, for each module, a module auxiliary current equal to a first fraction of the corresponding module current, a first stage, connected to the power supply terminal, including at least one current source configured so as to supply a stage current higher than the sum of the maximum values of each module auxiliary current, second generation means configured so as to generate an intermediate current equal to the difference between the stage current and a secondary current equal to the sum of each module auxiliary current, a regulating stage connected to the power supply terminal comprising a first branch configured so as to generate a reference potential from the intermediate current, a second branch comprising a regulating means and comparison means configured so as to control the voltage of the regulating means such that a potential of the second branch is equal to the reference potential, the potential being obtained by multiplying a current circulating in the branch by an impedance equal to the first fraction, and a terminal stage connected to the power supply terminal and configured so as to multiply the intermediate current by a multiplication factor equal to one.

According to one embodiment, the first branch of the regulating stage comprises a first resistive impedance having a unit value and comprising an input connected to the power supply and an output connected to the terminal stage and to a first input of the comparison means, the second branch of the regulating stage comprising a second resistive impedance having a value equal to the first fraction and comprising a first terminal connected to the power supply and a second terminal connected to a second input of the comparison means and to the regulating means.

According to another embodiment, the first impedance circuit comprises a first resistor and the second impedance circuit comprises a second resistor, the comparison means comprising an operational amplifier, an inverting input whereof is connected between the first resistor and the second terminal and a non-inverting input is connected between the second resistor and the regulating means.

The use of resistors improves the dynamics of the device in the transient phase.

According to yet another embodiment, the device can further comprise a cascode transistor and a bias voltage source connected to the first terminal and to the gate so as to bias the cascode transistor, the drain of the transistor being connected to the non-inverting input of the operational amplifier and the source of the transistor being connected to the regulating means.

The cascode transistor protects the drain of the regulating transistor against a rise in potential.

According to yet another embodiment, the first impedance circuit comprises a first NMOS transistor and the second impedance circuit comprises a second NMOS transistor, the comparison means comprising an operational amplifier, an inverting input whereof is connected to the source of the first transistor and a non-inverting input is connected between the source of the second transistor, the drain of the first and second transistors being connected to the input, the device further comprising a biasing source connected to the input and to the gates of the first and second transistors to bias the transistors.

The production of resistive impedance circuits from transistors allows the components of the device to be equalized.

According to yet another embodiment, the first impedance circuit comprises a first NMOS transistor and the second impedance circuit comprises a second NMOS transistor, the comparison means comprising a first operational amplifier, an inverting input whereof is connected to the source of the first transistor and a non-inverting input is connected between the source of the second transistor, the drain of the first and second transistors being connected to the input, the device further comprising a second operational amplifier, an output whereof is connected to the gate of the first and second transistors, an inverting input is connected to the source of the first transistor and the non-inverting input is connected to the terminal stage.

According to yet another embodiment, the first generation means include, for each module, a first current mirror having a copy factor equal to the first fraction, having a first output supplying the corresponding module current and a second output supplying the corresponding module auxiliary current, the second generation means include a second current mirror having a copy factor equal to one, and the second output of the first current mirror is connected to the input of the second current mirror and the output of the second current mirror is connected to the output of the first stage.

According to yet another embodiment, the terminal stage includes a current copying means having a copy factor equal to one, the input whereof is connected to the output of the second generation means and the output whereof is connected to the first branch.

According to yet another embodiment, the terminal stage includes a first MOS transistor connected to the output of the second current mirror, and at least one second MOS transistor connected between the power supply terminal and the ground, the gates of the MOS transistors being connected together, and the device further comprises an intermediate operational amplifier, the non-inverting input whereof is connected to the output of the second current mirror, the inverting input whereof is connected to the input of the second current mirror, and the output whereof is connected to the gates of the MOS transistors.

In order to improve the current copying by the second generation means, in particular when the module auxiliary current or the sum of the module auxiliary currents is close to the stage current, an intermediate operational amplifier can also be added, the non-inverting input whereof is connected to the output of the second current mirror, the inverting input whereof is connected to the input of the second current mirror, and the output whereof is connected to the gates of the MOS transistors of the terminal stage.

According to yet another embodiment, the first generation means comprise, for each module, a cascode stage connected between the second output of the corresponding first current mirror and the input of the second current mirror, the cascode stage comprising a second PMOS transistor and a second operational amplifier, the non-inverting input whereof is connected between the power supply terminal and the corresponding module, the inverting input whereof is connected to the source of the second PMOS transistor and the output whereof is connected to the gate of the second PMOS transistor.

Moreover, in order to improve the current copying, the first generation means can comprise, for each module, a first cascode stage connected between the second output of the corresponding first current mirror and the input of the second current mirror, the first cascode stage comprising a first PMOS transistor and a first operational amplifier, the non-inverting input whereof is connected between the power supply terminal and the corresponding module, the inverting input whereof is connected to the source of the first PMOS transistor and the output whereof is connected to the gate of the first PMOS transistor.

According to yet another embodiment, the device further comprises a capacitive noise generator.

According to yet another embodiment, the device comprises at least one regulator connected between the power supply terminal and the at least one module, configured so as to supply a regulated voltage to the at least one module.

According to yet another embodiment, the regulator includes the first generation means.

According to yet another embodiment, the device includes a plurality of modules, and in which the first generation means include a plurality of first outputs respectively connected to the modules so as to supply the respective module currents and a plurality of second outputs jointly connected to the input of the second generation means so as to supply the secondary current.

According to another aspect, an appliance incorporates an integrated circuit as defined hereinabove.

BRIEF DESCRIPTION OF THE DRAWINGS

Other advantages and features of the invention will become apparent upon examining the detailed description of non-limiting embodiments, and from the accompanying drawings in which.

DETAILED DESCRIPTION OF ILLUSTRATIVE EMBODIMENTS

In the following description, the terms "coupled" and "connected" denote an electrical connection which is either direct, or indirect via other devices or means of connection.

Figure 1:
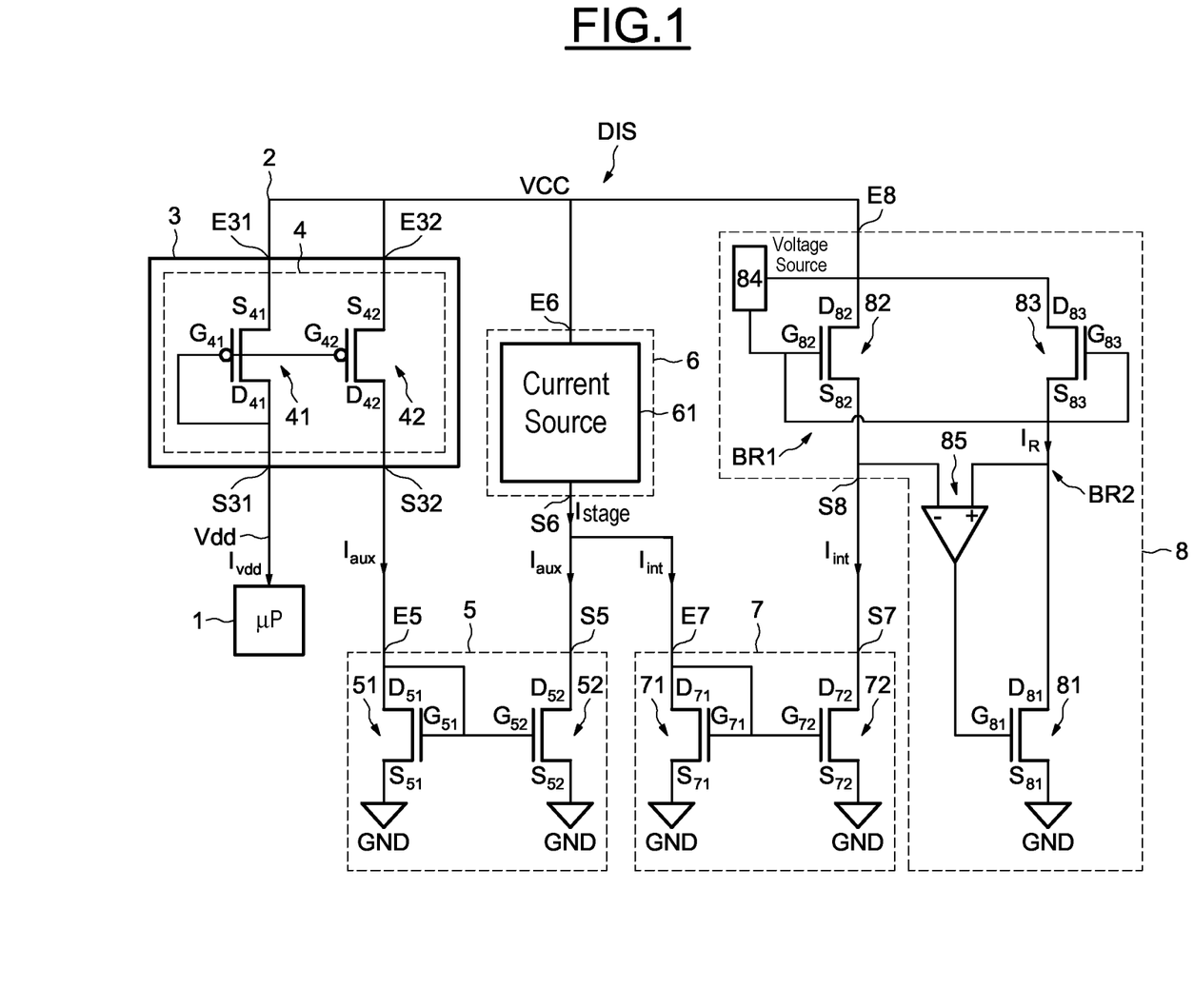
FIG. 1 shows an example of a first embodiment of an electronic device.

Reference is now made to FIG. 1, which shows an example of a first embodiment of an electronic device DIS.

The device DIS comprises a module 1, for example, a microprocessor of a smart card. The device can be situated within the integrated circuit of the smart card.

The device DIS further comprises a power supply terminal 2 intended to receive a power supply voltage $V_{cc}$, for example, a voltage of 5 Volts.

The device further comprises first generation means 4 including a first input E31 and a second input E32 connected to the power supply terminal 2, in addition to a first output S31 and a second output S32.

The device further comprises second generation means 5 including an input E5 and an output S5, a first stage 6 of one or more current sources including an input E6 connected to the power supply terminal 2 and an output S6, a terminal stage 7 including an input E7 and an output S7, and a second regulating stage 8 including an input E8 connected to the power supply terminal 2 and an output S8.

The respective connections and features thereof will be described in more detail hereinbelow.

A regulator 3 is connected between the power supply terminal 2 and the microprocessor 1 so as to supply a regulated voltage $V_{dd}$ to the microprocessor, for example in this case, a voltage of 2.5 Volts.

The microprocessor 1 consumes a current $I_{vdd}$, the value whereof depends on the operations that it carries out.

In this example, the regulator 3 comprises the first generation means 4, in this case a first current mirror which supplies, at the input E5 of the second generation means 5, an auxiliary current $I_{aux}$ equal to a first fraction of the current consumed $I_{vdd}$. In this example, the current mirror has a copy factor equal to 1/100, i.e. it supplies a module auxiliary current $I_{aux}$ equal to one hundredth of the current consumed $I_{vdd}$ (the first fraction is equal to 1/100).

The first current mirror conventionally comprises two transistors 41 and 42 coupled together via the gates $G_{41}$, $G_{42}$ thereof.

The first transistor 41, for example a PMOS transistor, is configured as a diode (i.e. the gate G and the drain D thereof are connected). The source S41 thereof, which forms the first input E31 of the first generation means, is connected to the first power supply terminal, and the drain $D_{41}$ thereof, which forms the first output S31 of the first generation means, is connected to the module 1.

The source $S_{42}$ of the second transistor 42, for example a second PMOS transistor, which source forms the second input E32 of the first generation means 4, is connected to the power supply terminal 2, and the drain $D_{42}$ thereof, which forms the second output S32 of the first generation means, is connected to the input E5 of the second generation means 5.

To obtain the first fraction of the consumed current $I_{vdd}$, the second PMOS transistor can be chosen having a ratio $W_{42}/L_{42}$ between the width $W_{42}$ and the length $L_{42}$ of its channel that is 100 times smaller than the ratio $W_{41}/L_{41}$ between the width $W_{41}$ and the length $L_{41}$ of the channel of the first transistor 41.

An alternative approach would be to have a plurality of first transistors 41 mounted in parallel and one or more second transistors 42 identical to the first transistors 41 and mounted in parallel, such that the number of first transistors is 100 times greater than the number of second transistors.

In this example, the second generation means 5 comprise a second current mirror with a copy factor equal to one, which conventionally includes two identical transistors 51 and 52, for example NMOS transistors, coupled together by the gates $G_{51}$ and $G_{52}$ thereof.

The first NMOS transistor 51 is configured as a diode. The drain $D_{51}$ thereof, which forms the input E5 of the second generation means 5, is connected to the drain $D_{42}$ of the second PMOS transistor 42 of the first current mirror, and the source $S_{51}$ thereof is connected to the ground GND.

The source $S_{52}$ of the second NMOS transistor 52 is connected to the ground, and the drain $D_{52}$ thereof, which forms the output S5 of the second generation means 5, is connected to the input E7 of the terminal stage 7 and to the output S6 of the first stage 6.

Thus, the second generation means receive the module auxiliary current $I_{aux}$ at the input E5 and copy this same module auxiliary current $I_{aux}$ at the output S5.

In this case, the first stage 6 comprises a main current source 61 connected between the power supply terminal 2 and the input E7 of the terminal stage.

This main current source 61 is configured so as to supply a stage current $I_{stage}$, equal to the first fraction of a reference current $I_{set}$.

Thus, in this example where the module auxiliary current $I_{aux}$ is equal to $$\frac{Ivdd}{100},$$

the stage current $I_{stage}$ is equal to $$\frac{Iset}{100}.$$

The reference current $I_{set}$ is chosen to be higher than the maximum value of the module current $I_{vdd}$.

This maximum value is, for example, determined by simulation during the design of the integrated circuit taking into account the foreseeable activity of the module 1.

Since the reference current $I_{set}$ is higher than the maximum value of the maximum module current, the stage current $I_{stage}$ is higher than the maximum value of the module auxiliary current $I_{aux}$.

The value of the first fraction is chosen from among a set of values.

For example, the set of values can be $$\left\{\frac{1}{100}; \frac{1}{60}; \frac{1}{50}; \frac{1}{40}\right\},$$

and the stage current $I_{stage}$ supplied can thus be equal to $$\frac{Iset}{100}, \text{ or } \frac{Iset}{60},$$

etc.

Since the first stage 6 supplies a stage current $I_{stage}$ equal to $$\frac{Iset}{100},$$

the terminal stage 7 thus receives a positive intermediate current $I_{int}$ equal to $$\frac{Iset}{100} - \frac{Ivdd}{100}$$

at the input E7 thereof.

The second generation means 5 are configured so as to generate an intermediate current equal to the difference between the stage current and a secondary current $I_{sec}$ equal to the sum of each module auxiliary current $I_{aux}$.

The terminal stage 7 includes, in this example, a third current mirror having a copy factor equal to 1, configured so as to copy the current $I_{int}$.

This third current mirror conventionally comprises a third and a fourth transistor 71 and 72, for example in this case NMOS transistors, coupled together via the gates $G_{71}$ and $G_{72}$ thereof.

The third NMOS transistor 71 is configured as a diode. The source $S_{71}$ thereof is connected to the ground, and the drain $D_{71}$ thereof, which forms the input E7 of the terminal stage, is connected to the output S5 of the second generation means and to the output S6 of the first stage.

The source $S_{72}$ of the fourth NMOS transistor 72 is connected to the ground GND and the drain $D_{72}$ thereof is connected to the output S8 of the second regulating stage 8.

Thus, the terminal stage receives, at the input E7, an intermediate current $I_{int}$ equal to the difference between the stage current $I_{stage}$ and the auxiliary current $I_{aux}$, and copies this intermediate current $I_{int}$ at the output S7.

The second regulating state 8 comprises a first branch BR1 configured so as to generate a reference potential from the intermediate current, a second branch BR2 comprising a regulating means comprising, for example, a regulating transistor 81 and comparison means configured so as to control the gate G81 of the transistor such that a potential of the second branch BR2 is equal to the reference potential, the potential of the second branch BR2 is obtained by multiplying a current equal to the inverse of the first fraction of the intermediate current $I_{int}$ circulating in the branch by an impedance equal to the first fraction.

The reference potential is obtained by multiplying a current circulating in the first branch BR1 by a unit impedance.

The first branch BR1 comprises a fifth transistor 82, the drain D82 whereof is connected to the input E8, the source S82 is connected to the output S8.

The second branch BR2 comprises a sixth transistor 83, the drain D83 whereof is connected to the input E8, the source S83 is connected to the drain D81 of the transistor 81, the source S81 of the transistor 81 being connected to the ground GND. A current $I_R$ circulates in the second branch BR2.

The second stage 8 further comprises a bias voltage source 84 powered by the input E8 and supplying a bias voltage over each of the gates G82 and G83 of the fifth and sixth MOS transistors 82 and 83.

The transistors 82 and 83, in addition to the bias voltage, are chosen such that the resistive impedance of the transistor 82 is equal to R (unit impedance) and the resistive impedance of the transistor 83 is equal, for example, to the first fraction multiplied by the unit impedance, i.e. R/100 such that the current $I_R$ is one hundred times greater than the current Iint.

To obtain the consumed current $I_R$, the sixth MOS transistor 83 can be chosen having a ratio $W_{83}/L_{83}$ between the width $W_{83}$ and the length $L_{83}$ of its channel that is one hundred times greater than the ratio $W_{82}/L_{82}$ between the width $W_{82}$ and the length $L_{82}$ of the channel of the fifth transistor 82.

The comparison means comprise, for example, an operational amplifier 85, the inverting input whereof is connected to the source of the transistor 82 and the non-inverting input is connected to the source of the transistor 83.

In operation, the device DIS thus configured therefore consumes
the first current $I_{vdd}$,
the module auxiliary current $$I_{aux} = \frac{Ivdd}{100},$$

the stage current $$I_{stage} = \frac{Iset}{100},$$

and
the terminal current $I_{int}=I_{stage}-I_{aux}$, and
since the potentials at the two inputs of the operational amplifier 82 are equal, the device further consumes the current $I_R=I_{set}-I_{vdd}$ The current $I_{vcc}$ consumed by the power supply is thus equal to the sum of these currents, i.e. $1.02*I_{set}$ (obtained by adding $I_{vdd}$, $I_{aux}$, $I_{stage}$, $I_{int}$ and $I_R$) and thus does not depend on the module current $I_{vdd}$, but only on the reference current $I_{set}$, which is constant and in this case higher than the maximum value of the module current $I_{vdd}$.

The transistors 71, 72 and 81 comprise, for example, low-voltage transistors such that they comprise a very low stray capacitance. The transistors 82 and 83 comprise transistors having a high W/L ratio such that they comprise a high stray capacitance.

However, since the transistors 82 and 83 are biased by the voltage source 84 at a fixed voltage, and since the transistors 71, 72 and 81 comprise low-voltage transistors, the dynamic response of the device DIS in the transient phase is improved.

Figure 2:
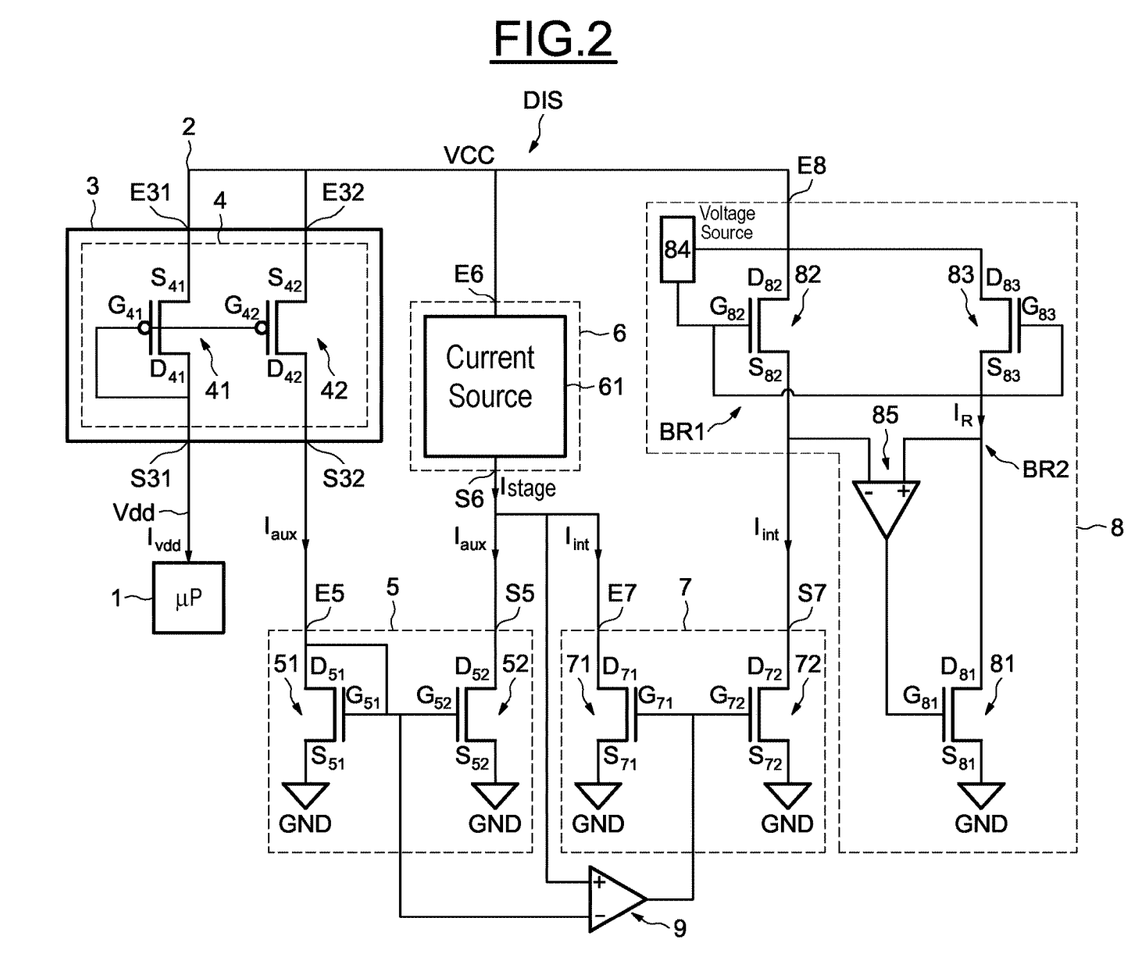
FIG. 2 shows an embodiment in which the third NMOS transistor of the terminal stage is no longer configured as a diode.

FIG. 2 shows a second embodiment. In this embodiment, the device DIS as previously described has been modified in such a manner that the third NMOS transistor 71 of the terminal stage is no longer configured as a diode.

An operational amplifier 9 has been added between the second generation means 5 and the terminal stage 7.

The non-inverting input thereof is connected to the input E7 of the terminal stage, and the inverting input thereof is connected to the mutually-coupled gates $G_{51}$ and $G_{52}$ of the first and of the second NMOS transistors 51 and 52, i.e. to the first input E5 of the second generation means 5 since the first NMOS transistor 51 is configured as a diode.

The output of the amplifier 9 is connected to the mutually-coupled gates $G_{71}$ and $G_{72}$ of the third NMOS transistor 71 and of the fourth NMOS transistor 72.

Thus, by controlling the gate $G_{71}$ of the third NMOS transistor 71 in such a manner as to equalise the potentials of the drains $D_{51}$ and $D_{52}$ of the first and second NMOS transistors 51 and 52, the operational amplifier allows an intermediate current $I_{int}$ to be obtained at the input E7 of the terminal stage which is precisely equal to the difference between the stage current $I_{stage}$ and the module auxiliary current $I_{aux}$, even if the module auxiliary current $I_{aux}$ has a value close to the stage current $I_{stage}$.

Figure 3:
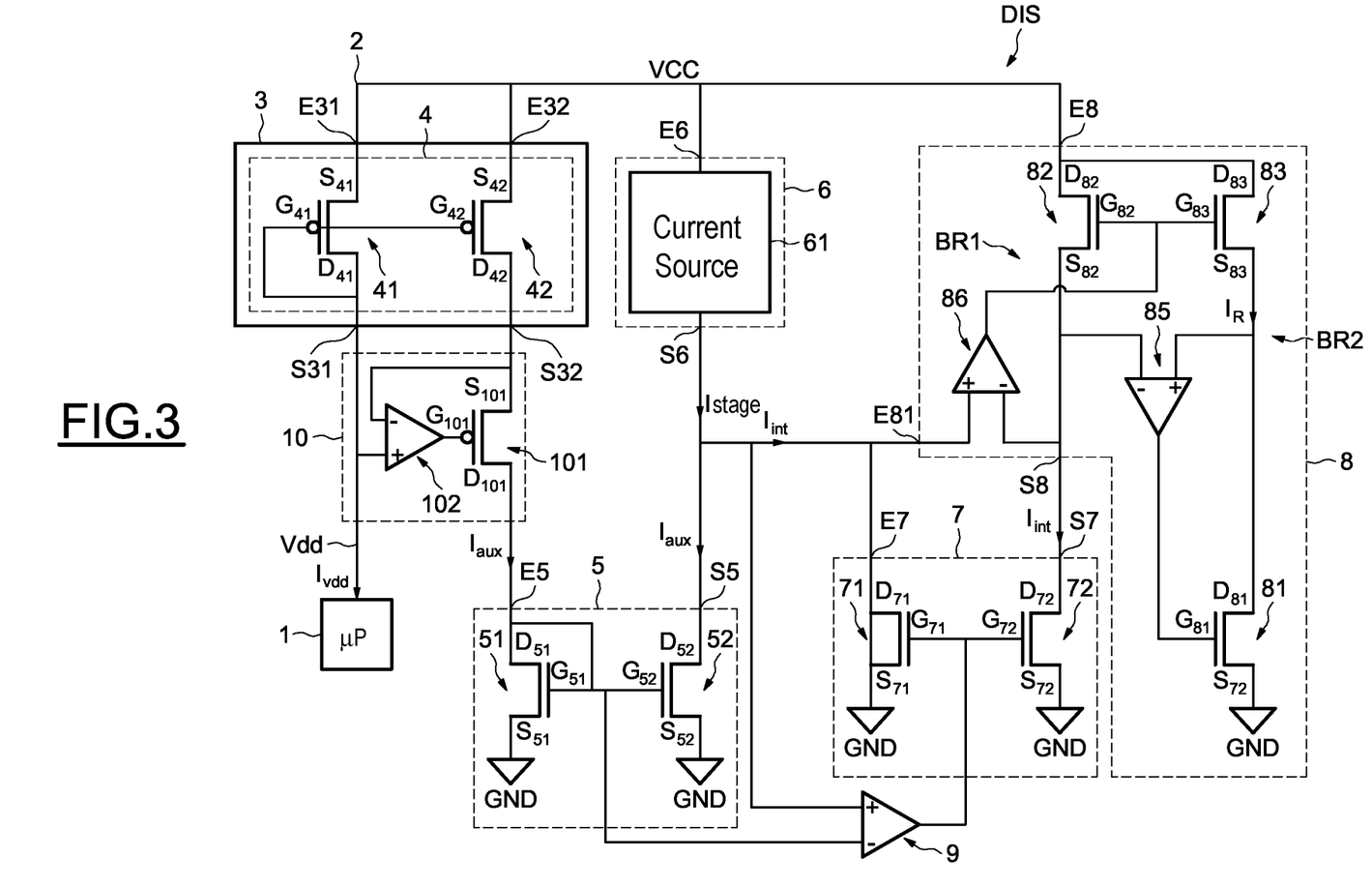
FIG. 3 shows another embodiment in which the regulating stage comprises a third operational amplifier replacing the voltage source controlling the gates of the NMOS transistors, and a second input connected to the input of the terminal stage.

According to another embodiment shown in FIG. 3, the regulating stage 8 can comprise a third operational amplifier 86 replacing the voltage source 84 controlling the gates G82 and G83 of the NMOS transistors 82 and 83, and a second input E81 connected to the input E7 of the terminal stage 7.

The non-inverting input of the amplifier 86 is connected to the second input E81 and the inverting input of the amplifier 86 is connected to the source S82 of the transistor 82.

Thus, the second amplifier 86 allows the voltages at the input E7 and at the output S7 of the terminal stage to be equalized, thus improving the precision of the current copying carried out by the terminal stage 7.

The device DIS can further comprise a cascode stage 10 comprising a seventh PMOS transistor 101, the source $S_{101}$ whereof is connected to the second output S32 of the first generation means, and the drain $D_{101}$ whereof is coupled to the input E5 of the second generation means 5.

The cascode stage 10 further comprises a fourth operational amplifier 102, the non-inverting input whereof is coupled to the first output S31 of the first generation means 4, and the inverting input whereof is coupled to the second output S32 of the first generation means 4. The output of the second operational amplifier 102 is coupled to the gate $G_{101}$ of the third PMOS transistor 101.

Thus, the first cascode stage 10 allows the voltages at the first and second outputs S31 and S32 of the first generation means to be equalized, which contributes to obtaining the desired ratio of 1/100 between the current $I_{vdd}$ and the auxiliary current $$I_{aux}=\frac{I_{vdd}}{100}.$$

The cascode stage 10 thus improves the precision of the current copying respectively carried out by the first generation means 4.

Figure 4:
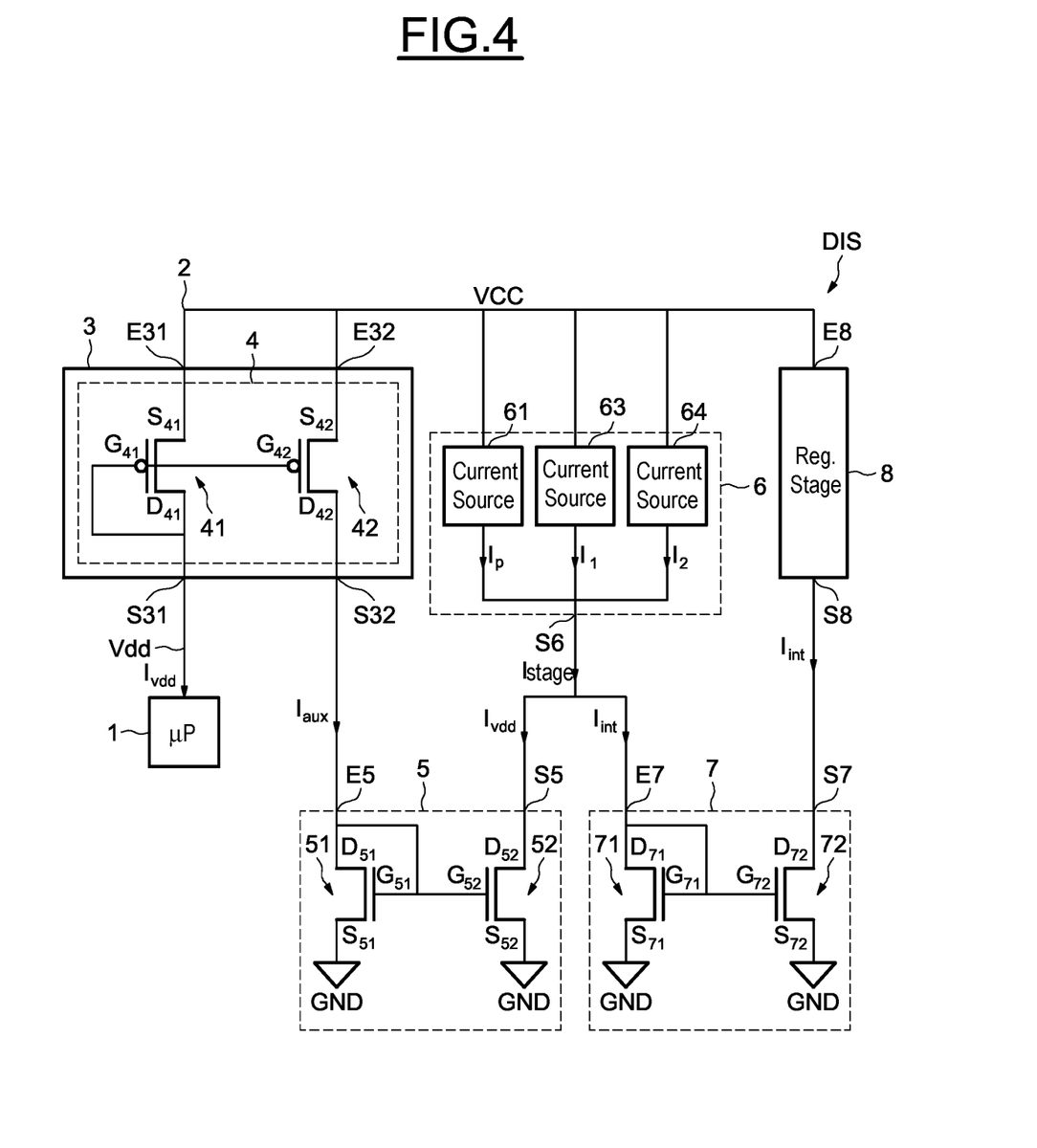
FIG. 4 shows an embodiment method in which the first stage is modified with respect to the device shown in FIG. 1.

FIG. 4 shows one embodiment method, in which the first stage 6 has been modified with respect to the device DIS previously described and shown in FIG. 1.

In this embodiment, the first stage comprises, in addition to the main current source 61 supplying the second fraction of the reference current $I_{set}$, a first additional current source 63 supplying a first additional current L and a second additional current source 64 supplying a second additional current $I_2$.

The three current sources, 61, 63, and 64 are configured in parallel between the power supply terminal 2 and the output S6 of the first stage 6, and the first and the second additional sources 63 and 64 are furthermore activatable independently of the main current source 61.

The stage current $I_{stage}$ supplied by the first stage 6 is thus a current equal to the sum of a main current $I_p$, of a first additional current $I_1$ and of a second additional current $I_2$ when the two additional current sources 63 and 64 are activated.

The total current $I_{vcc}$ consumed by the power supply is thus $I_{vcc}=1,02*Iset+102*I_1+102*I_2$.

Since the first and second additional current sources 63 and 64 can be independently activated, the current $I_{vcc}$ consumed by the power supply can successively take various values from among the following set of values:

$I_{vcc}=1,02*Iset+102*I_1+102*I_2$, $I_{vcc}=1,02*Iset+102*I_1$, $I_{vcc}=1,02*Iset+102*I_2$, $I_{vcc}=1,02*Iset$.

Thus, the detection of the variations of the module current $I_{vdd}$ are even more difficult to detect by attacks based on analysis of power consumption (SPA).

It should be noted that this modification of the first stage is compatible with the embodiments shown in FIGS. 2 and 3. It is presented here based on the embodiment shown in FIG. 1 for simplification purposes only.

Figure 5:
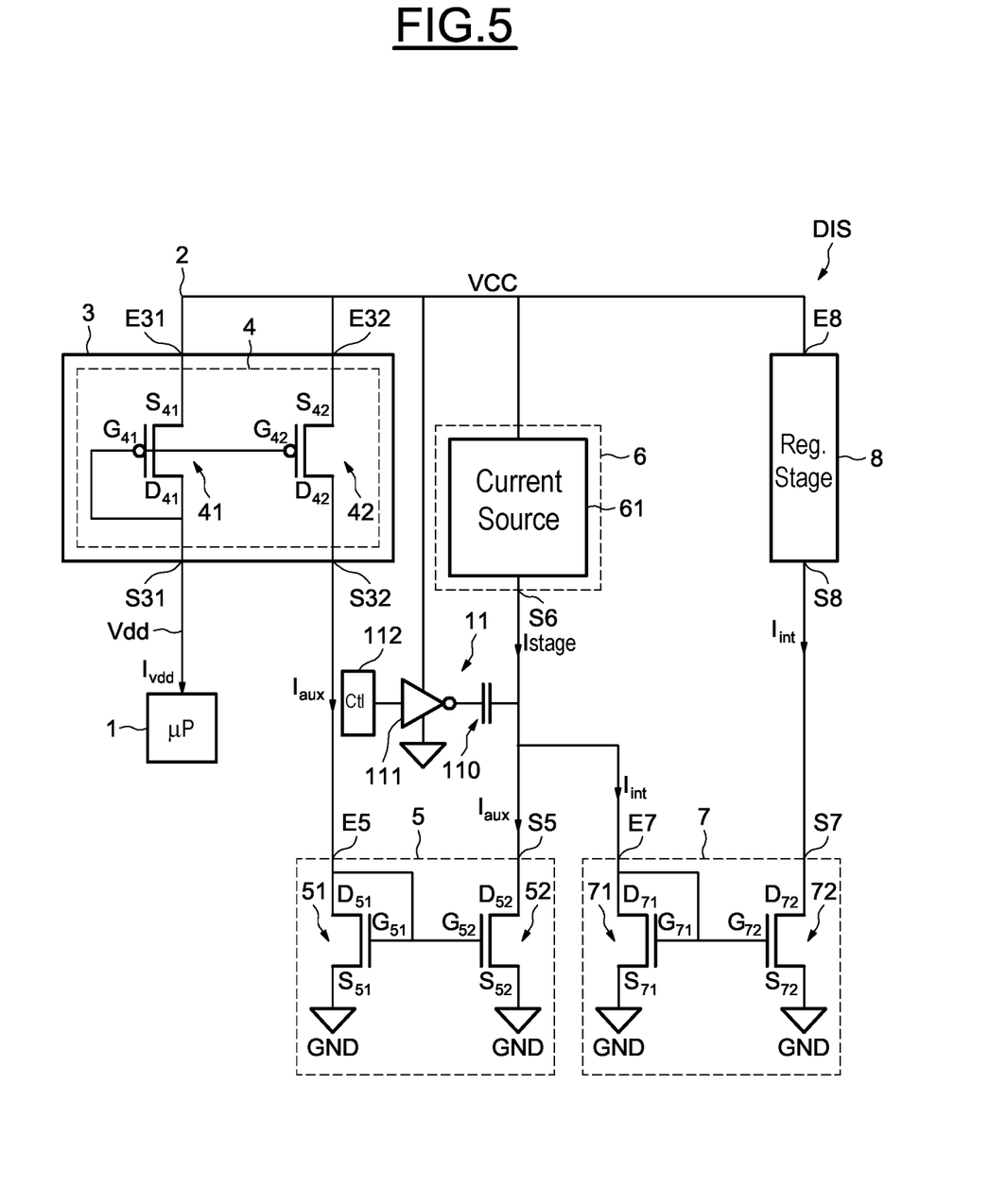
FIG. 5 shows an alternative embodiment that adds a capacitive noise generator at the output of the first stage.

According to an alternative embodiment shown in FIG. 5, it is also possible to add a capacitive noise generator at the output S6 of the first stage.

For example, in this case, the capacitive noise generator 11 comprises a capacitor 110, an inverter 111 and control means 112.

The capacitor no is connected via a first terminal to the output S6 of the first stage and via a second terminal to the inverter 111. The inverter 111 is powered between the power supply terminal 2 and the ground GND. The control means 112 are connected to the inverter 111 so as to, depending on the output of the inverter, charge or discharge the capacitor 110.

This embodiment is also compatible with the embodiments shown in FIGS. 1, 2, 3 and 4.

According to an alternative embodiment, the device can comprise a plurality of modules.

Figure 6:
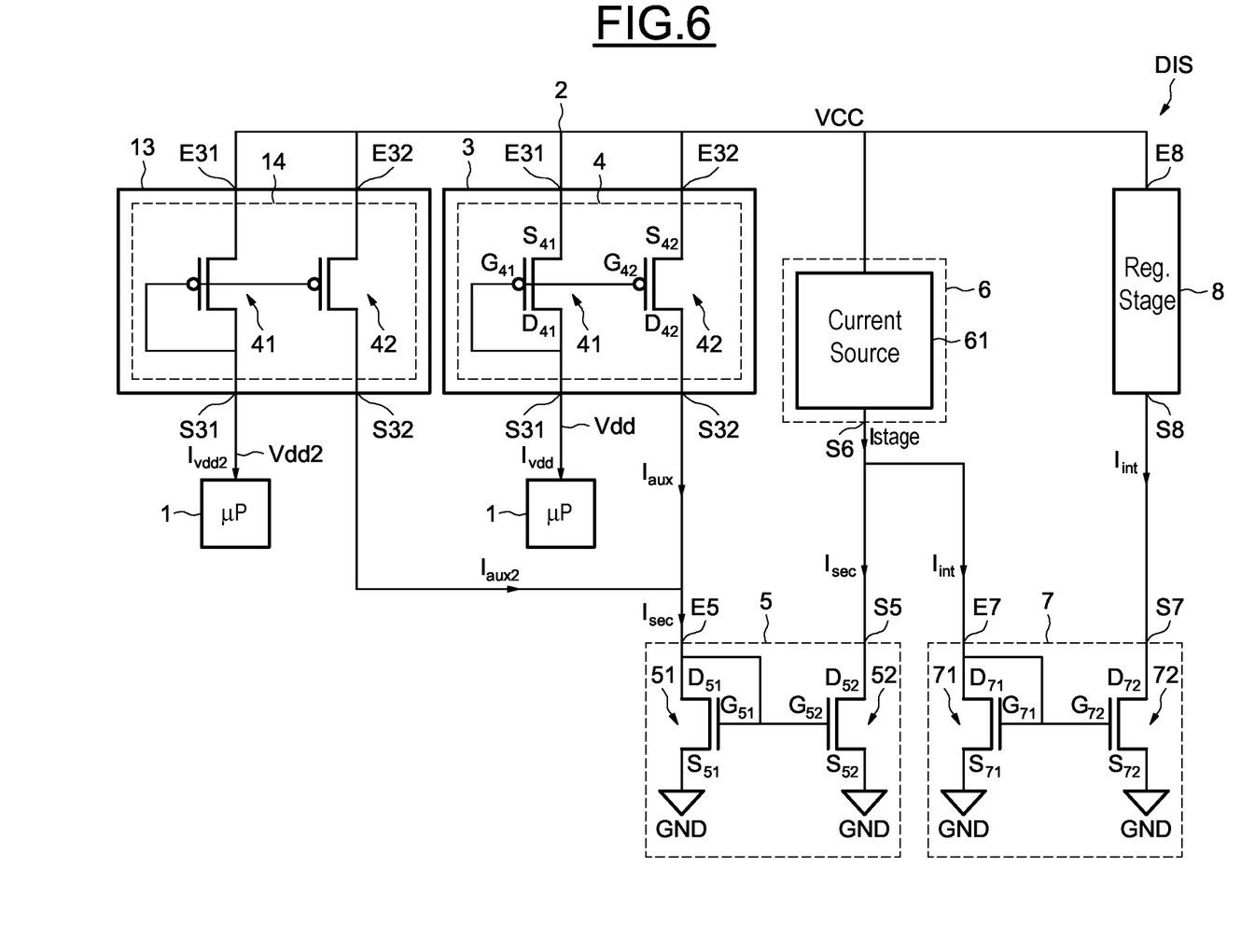
FIG. 6 shows an embodiment in which the device comprises a second module that consumes a second module current and a second regulator coupled between the power supply terminal and the second module.

For example, in the embodiment shown in FIG. 6, the device DIS comprises a second module 12, for example a second microprocessor, which consumes a second module current $I_{vdd2}$, and a second regulator 13 coupled between the power supply terminal 2 and the second module, further comprising first generation means 14.

The first generation means 14 thus supply a second module auxiliary current $I_{aux2}$ equal to the first fraction of the second module current $I_{vdd2}$ at the input E5 of the second generation means 5. In this example, $$I_{aux2} = \frac{I_{vdd2}}{100}.$$

Thus, the second generation means 5 receive a secondary current $I_{see}$ at the input E5 thereof equal to the sum of the auxiliary module currents $I_{aux}$ and $I_{aux2}$.

The stage current $I_{stage}$ is, in this example, slightly higher than the maximum value of the secondary current $I_{sec}$.

This embodiment is compatible with all of the embodiments described hereinabove and shown in FIGS. 1 to 5.

It should be noted that although embodiments have been described in which the current regulators 3 and 13 comprise the first generation means 4 and 14, an embodiment in which the regulators 3 and 13 are separate from the first generation means 4 and 14 can be considered.

Furthermore, the regulators are not indispensable. More specifically, each module could be powered by the power supply voltage $V_{cc}$ via a current mirror.

Moreover, although an efficient injection of capacitive noise at the output S6 of the first stage 6 has been described, capacitive noise could also be injected at other nodes, for example at the input E5 of the second generation means 5, or at the output of the operational amplifier 8.

Figure 7:
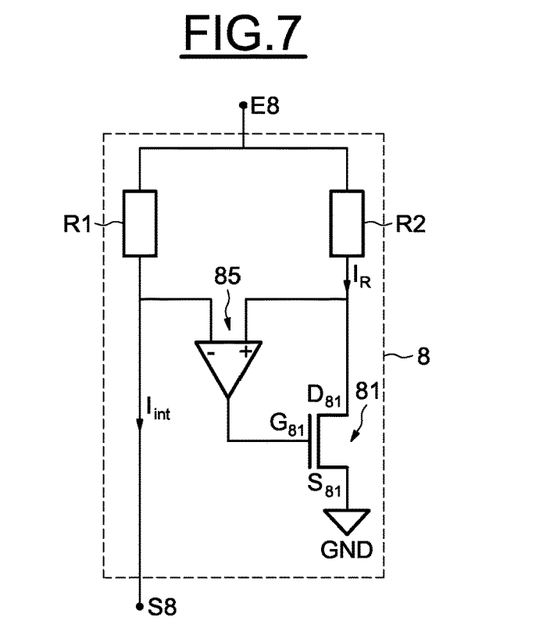
FIG. 7 shows a third embodiment of the regulating stage.

FIG. 7 shows a third embodiment of the regulating stage 8.

This embodiment of the regulating stage differs from the embodiment shown in FIG. 1 in that the transistors 82 and 83 are respectively replaced with resistive impedance circuits comprising resistors R1 and R2 of respective impedances R and R/100.

The replacement of the transistors with resistors further allows the dynamics of the device DIS to be improved in the transient phase.

Figure 8:
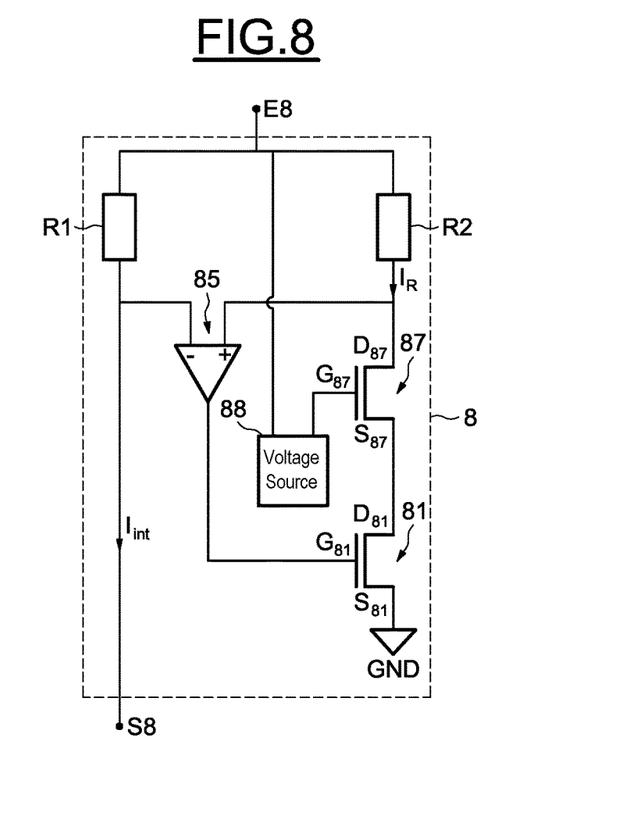
FIG. 8 shows a fourth embodiment of the regulating stage.

FIG. 8 shows a fourth embodiment of the regulating stage 8.

This embodiment differs from the embodiment shown in FIG. 7 in that the regulating stage 8 further comprises a cascode transistor 87 and a second bias voltage source 88 connected to the input E8 and to the gate G88 so as to bias the cascode transistor 87.

The drain D87 of the transistor 87 is connected to the resistor R2 and the source S87 of the transistor 87 is connected to the drain D81 of the regulating transistor 81.

The transistor 87 protects the low-voltage regulating transistor 81 against the voltage fluctuations capable of causing deterioration thereto.

What is claimed is:

1. A method for smoothing a current consumed by a power supply of an electronic circuit, the electronic circuit including at least one module directly or indirectly powered by the power supply and consuming a module current, comprising:
generating, within the electronic circuit, for each module, a module auxiliary current equal to a first fraction of the corresponding module current;
generating by a first stage, powered by the power supply, including at least one current source, a stage current higher than a sum of maximum values of each module auxiliary current;
generating an intermediate current equal to a difference between the stage current and a secondary current equal to a sum of each module auxiliary current;
applying the intermediate current to a first impedance circuit, in a first branch of a regulating stage powered by the power supply to produce a reference potential across the first impedance circuit; and
controlling a voltage of a voltage regulator of a second branch of the regulating stage to cause a voltage across a second impedance circuit in the second branch to be equal to the reference potential across the first impedance circuit, wherein a ratio of a resistance of the second impedance circuit to a resistance of the first impedance circuit is equal to the first fraction, and controlling the voltage of the voltage regulator comprises adjusting a second current flowing through the second impedance circuit while a first current flowing through the first impedance circuit remains at the intermediate current.

2. The method according to claim 1, wherein a value of the first fraction is chosen from among a set of values.

3. The method according to claim 1, wherein the first stage further includes at least one additional activatable current source supplying an additional current and the stage current is equal to a sum of a main current and of each additional current supplied by each activated additional current source.

4. The method according to claim 1, wherein capacitive noise is added in the electronic circuit.

5. An electronic device comprising:
a power supply terminal;
at least one module connected to the power supply terminal and configured to consume a module current;
a first current generator connected to the power supply terminal and configured to generate, for each module, a module auxiliary current equal to a first fraction of the corresponding module current;

a first stage, connected to the power supply terminal, including at least one current source configured to supply a stage current higher than a sum of maximum values of each module auxiliary current;

a second current generator configured to generate an intermediate current equal to a difference between the stage current and a secondary current equal to a sum of each module auxiliary current;

a regulating stage connected to the power supply terminal comprising a first branch configured to generate a reference potential across a first impedance circuit from the intermediate current, a second branch comprising a second impedance circuit, a voltage regulator and a comparator configured to control a voltage of the voltage regulator by adjusting a current through the second impedance circuit while a current through the first impedance circuit remains at the intermediate current such that a potential across the second impedance circuit equal to the reference potential, wherein a ratio of a resistance of the second impedance circuit to a resistance of the first impedance circuit is equal to the first fraction; and a terminal stage connected to the first branch and configured to multiply the intermediate current by a multiplication factor equal to one.

6. The device according to claim 5, wherein:
the first impedance circuit comprises a first terminal connected to the power supply terminal and a second terminal connected to the terminal stage and to a first input of the comparator; and
the second impedance circuit comprises a first terminal connected to the power supply terminal and a second terminal connected to a second input of the comparator and to the voltage regulator.

7. The device according to claim 6, wherein:
the first impedance circuit comprises a first resistor and the second impedance circuit comprises a second resistor; and
the comparator comprises an operational amplifier, an inverting input thereof is connected between the first resistor and the second terminal and a non-inverting input is connected between the second resistor and the voltage regulator.

8. The device according to claim 7, further comprising a cascode transistor and a bias voltage source connected to the first terminal and to a gate of the cascode transistor to bias the cascode transistor, a drain of the cascode transistor being connected to the non-inverting input of the operational amplifier and a source of the cascode transistor being connected to the voltage regulator.

9. The device according to claim 6, wherein the first impedance circuit comprises a first NMOS transistor and the second impedance circuit comprises a second NMOS transistor, the comparator comprising an operational amplifier, an inverting input thereof is connected to a source of the first NMOS transistor and a non-inverting input is connected between a source of the second NMOS transistor, drains of the first and second NMOS transistors being connected to the input, the device further comprising a biasing source connected to the input and to gates of the first and second NMOS transistors to bias the NMOS transistors.

10. The device according to claim 6, wherein the first impedance circuit comprises a first NMOS transistor and the second impedance circuit comprises a second NMOS transistor, the comparator comprising a first operational amplifier, an inverting input thereof is connected to a source of the first NMOS transistor and a non-inverting input is connected between a source of the second NMOS transistor, drains of the first and second NMOS transistors being connected to the input, the device further comprising a second operational amplifier, an output thereof is connected to gates of the first and second NMOS transistors, an inverting input is connected to the source of the first NMOS transistor and the non-inverting input is connected to the terminal stage.

11. The device according to claim 5, wherein:
the first current generator includes, for each module, a first current mirror having a first copy factor equal to the first fraction, having a first output supplying the corresponding module current and a second output supplying the corresponding module auxiliary current;
the second current generator include a second current mirror having a second copy factor equal to one; and
the second output of the first current mirror is connected to an input of the second current mirror and an output of the second current mirror is connected to an output of the first stage.

12. The device according to claim 11, wherein the terminal stage includes a third current mirror having a third copy factor equal to one, an input thereof is connected to an output of the second current generator and an output thereof is connected to the first branch.

13. The device according to claim 12, wherein the terminal stage includes a first MOS transistor connected to the output of the second current mirror, and at least one second MOS transistor connected between the power supply terminal and ground, gates of the MOS transistors being connected together, and the electronic device further comprises an intermediate operational amplifier, a non-inverting input thereof is connected to the output of the second current mirror, an inverting input thereof is connected to an input of the second current mirror, and an output thereof is connected to the gates of the MOS transistors.

14. The device according to claim 11, wherein the first current generator comprises, for each module, a cascode stage connected between the second output of the corresponding first current mirror and an input of the second current mirror, the cascode stage comprising a second PMOS transistor and a second operational amplifier, a non-inverting input thereof is connected between the power supply terminal and the corresponding module, an inverting input thereof is connected to a source of the second PMOS transistor and an output thereof is connected to a gate of the second PMOS transistor.

15. The device according to claim 14, wherein the first current generator comprises, for each module, a first cascode stage connected between the second output of the corresponding first current mirror and the input of the second current mirror, the first cascode stage comprising a first PMOS transistor and a first operational amplifier, the non-inverting input thereof is connected between the power supply terminal and the corresponding module, the inverting input thereof is connected to a source of the first PMOS transistor and the output thereof is connected to a gate of the first PMOS transistor.

16. The device according to claim 5, further comprising a capacitive noise generator connected to an output of the first stage.

17. The device of claim 16, wherein the capacitive noise generator comprises:
a capacitor coupled to the output of the first stage;
an inverter coupled to the capacitor; and
a control circuit couple to the inverter.

18. The device according to claim 5, comprising at least one regulator connected between the power supply terminal and the at least one module, and configured to supply a regulated voltage to the at least one module.

19. The device according to claim 18, wherein the at least one regulator includes the first current generator.

20. The device according to claim 5, including a plurality of modules and wherein the first current generator includes a plurality of first outputs respectively connected to the modules to supply the respective module currents and a plurality of second outputs jointly connected to an input of the second current generator to supply the secondary current.

21. An electronic device comprising:
a module connected to a power supply terminal and configured to consume a module current;
a first current mirror coupled to a current output of the module and configured to provide a module auxiliary current equal to a first fraction of the module current;
an adjustable current source configured to provide a selectable current higher than the module auxiliary current;
a second current mirror configured to generate an intermediate current by mirroring a difference between the selectable current and the module auxiliary current;
a first resistor having a first terminal connected to the power supply terminal and a second terminal connected to an output of the second current mirror;
a second resistor having a first terminal connected to the power supply terminal;
a transistor having an output node coupled to a second terminal of the second resistor; and
an amplifier having a first input connected to the second terminal of the first resistor, and second input connected to the second terminal of the second resistor, and an output coupled to a control terminal of the transistor, wherein the amplifier is configured to control a current flowing the second resistor while a current flowing through the first resistor remains at the intermediate current, and a ratio of the intermediate current to the current flowing through the second resistor is equal to a ratio of a resistance of the first resistor to a resistance of the second resistor.

22. The device according to claim 21, wherein the ratio of the intermediate current to the current flowing through the second resistor is equal to the first fraction.

* * * * *